United States Patent [19]
Caudill

[11] 3,854,842
[45] Dec. 17, 1974

[54] ROTOR BLADE HAVING IMPROVED TIP CAP

[75] Inventor: Corbett D. Caudill, Franklin, Ohio

[73] Assignee: General Electric Company, Cincinnati, Ohio

[22] Filed: Apr. 30, 1973

[21] Appl. No.: 355,313

[52] U.S. Cl. ............................... 415/116, 415/178
[51] Int. Cl. ..................... F04d 29/08, F01d 5/00
[58] Field of Search .......... 416/92, 96, 97; 415/115, 415/116, 117, 178, 174; 277/53, 56, 57

[56] References Cited
UNITED STATES PATENTS
3,339,933   9/1967   Foster ................................ 277/96
3,628,885   12/1971  Sidenstick ....................... 416/96 A FOREIGN PATENTS OR APPLICATIONS
711,419   6/1931   France ............................. 415/178

*Primary Examiner*—Henry F. Raduazo
*Attorney, Agent, or Firm*—Derek P. Lawrence; Lee H. Sachs

[57] ABSTRACT

A turbomachinery rotor blade for use in cooperation with a circumscribing shroud and a moving fluid includes an internal cavity for cooling air, a pair of spaced radially extending side walls which combine to form an airfoil, and an open end between the radial extremities of the side walls. A tip cap is disposed within the open end, the tip cap including an axially extending closure plate for providing a partial seal between the blade interior and the blade environment and further including a rib extending radially outwardly from the closure plate. The rib and the radial extremities of the blade side walls extend into proximity with the shroud and form a labyrinth seal therewith against leakage of the operating fluid past the tip cap. In addition, the rib serves to subdivide the tip space and to distribute cooling air therethrough, the cooling air being provided by an aperture near the leading edge of the blade.

12 Claims, 3 Drawing Figures

PATENTED DEC 17 1974 3,854,842

ROTOR BLADE HAVING IMPROVED TIP CAP

BACKGROUND OF THE INVENTION

This invention relates to airfoil blades for use in gas turbine engines and, more particularly, to cooling and sealing means therefor.

The invention herein described was made in the course of or under a contract, or a subcontract thereunder, with the United States Department of the Air Force.

Turbomachinery rotor blades of certain varieties operate in extremely high temperature environments. In order to maintain the blades in operable condition, means are provided for providing cooling fluid (usually air) to the blades reducing the associated surface temperatures. One area which is particularly troublesome in this regard is the blade tip, the radial extremity of the blade.

One characteristic of the blade tip which makes it difficult to cool is the fact that it is disposed in proximity with a circumscribing shroud. The shroud serves to define a flow path for the operating fluid of the turbomachine, and the proximity between the shroud and the blade tip is the result of attempts to improve engine efficiency by minimizing leakage of operating fluid past the blade tips. In order to cool the blade tip, a recessed cap has been provided in the prior art which combines with the side walls and shroud to form a tip space within which cooling air is passed from a blade internal cavity in order to cool the tip area.

Fabrication limitations prevent the formation of a perfect seal between the side walls and the shroud; and hence, a certain quantity of operating fluid (which is often in temperatures in excess of 2,000°) can leak into the tip space and reside therein with obvious deleterious effects upon the tip structure. Should this leakage become substantial, the overall efficiency of the engine as well as the life and reliability of the blade tips will suffer.

One further problem associated with this prior art tip design relates to the circulation of cooling air within the tip space. Engine efficiency requires a minimization of cooling air usage, which in turn demands that cooling air application be as efficient as possible. In furtherance of this aim, the tip space of the prior art is generally cooled by cooling air passed from an internal blade cavity to the tip space by means of an aperture in the tip cap. In order to maximize cooling efficiency, it is necessary to maximize circulation of the cooling air within the tip space. The relationship between the height and width of the tip space of the prior art has been such that highly effective cooling air circulation has not been achieved within the tip space.

The present invention provides a solution for these various problems of the prior art by the provision of an element which serves to concurrently increase sealing efficiency between the blade tip and circumscribing shroud, increase the height over width ratio of the tip space to enhance cooling and subdivide the tip space to further reduce cooling problems. In addition, the element serves to increase the circulation of cooling air within the tip space.

BRIEF SUMMARY OF THE INVENTION

It is therefore a primary object of the present invention to provide a turbomachinery rotor blade having an improved tip cap which enhances cooling of the tip region as well as sealing between the tip and associated shroud to increase sealing effectiveness against leakage of operating fluid past the tip cap.

In order to accomplish this as well as other objects which will become apparent from the description which follows, the present invention provides a tip cap for disposition within an open end of a blade cooperating with a circumscribing shroud. The cap includes an axially extending closure plate for partially isolating the plate interior from its environment and an upstanding rib extending radially from the closure plate and into proximity with the shroud. The rib combines with the radial extremities of the blade side walls to define a labyrinth seal with the shroud which is effective against leakage of operating fluid. In addition, the rib reduces the volume of the tip space to increase the cooling effectiveness of air directed to the tip space by an aperture in the closure plate from an internal blade cavity. Furthermore, the rib directs the air from the aperture (which is disposed near the leading edge of the blade) throughout the tip space to enhance the circulation and cooling thereof. To enhance structural reliability, the tip cap is provided with flanges disposed at the lateral edges of the tip cap which are adapted to cooperate with a shoulder and recess within the blade open end in a secure relationship.

BRIEF DESCRIPTION OF THE DRAWING

The present invention will be more easily understood by reference to the following description taken in conjunction with the appended drawing, wherein.

DETAILED DESCRIPTION OF A PREFERRED EMBODIMENT

While the present invention is capable of broad structural variation, it will be described hereinafter with reference to a preferred embodiment illustrated in the foregoing figures.

Figure 1:
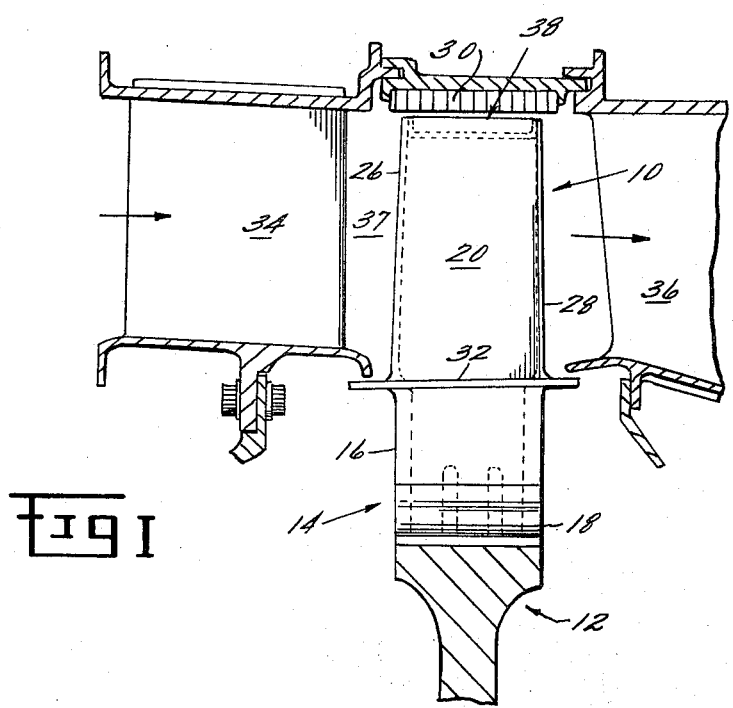
FIG. 1 is a cross-sectional view of a portion of a gas turbine engine incorporating a blade according to the present invention.

The present invention, in one form thereof, may be utilized in conjunction with a turbomachinery rotor blade as illustrated in FIG. 1. The blade is designated generally 10 and cooperates with a rotatable disc 12 by means of a dovetail cooperation 14 between the root of the blade 16 and a slot 18 in the disc. The blade includes an airfoil 20 which, referring to FIGS. 2 and 3, can be seen to incorporate a pair of spaced radially extending side walls 22 and 24. The blade has a leading edge 26 and a trailing edge 28.

The blade pictured in FIG. 1 is utilized in the turbine of a turbomachine and as such extracts kinetic energy from a rapidly moving and high temperature flow of working fluid passing in the direction of the arrows illustrated. In order to enhance the efficiency of this operation, an aerodynamically efficient flow path for the operating fluid is defined between an encircling shroud 30 and a platform 32 carried by the blade and disposed between the airfoil 20 and blade root 16. To further enhance this operation, airfoil shaped stators 34 and 36 are disposed to the upstream and downstream sides, respectively, of blade 10. These stators function to turn the operating fluid into a direction to improve the angle of attack between the fluid and blade 10 as well as downstream rotor blades, not shown. Actually, the rotor and stator stages comprise annular arrays of blades disposed about the centerline of the engine, but for simplicity an individual of each blade is herein considered.

In operation, the turbomachine contempated operates in a fashion similar to typical machines of this variety. A high energy fuel is combusted with compressed air in an upstream combustor, not shown, and directed along the flow path 37 and into contact with stator blade 34. The flow is turned by stator 34 and directed into contact with airfoil 20 to which a portion of kinetic energy of the fluid is imparted. This portion of the kinetic energy of the fluid is utilized to turn a shaft, not shown, to which a disc 12 is attached for the purpose of operating an air compressor and other mechanical portions of the engine. The fluid leaving airfoil 20 is again turned by downstream stator blade 36 and directed into contact with the subsequent rotor stages. The operating fluid exiting the turbine provides a driving thrust toward the left in FIG. 1 which is the motive product of the engine.

Figure 2:
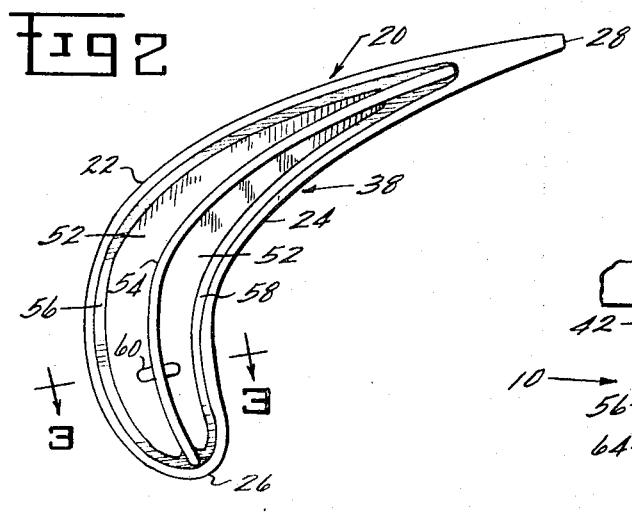
FIG. 2 is a end view of a blade according to the present invention and particularly illustrating the tip cap thereof.
Figure 3:
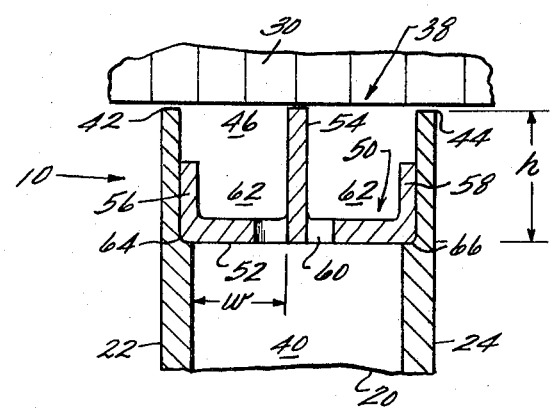
FIG. 3 is a cross-sectional view of a blade according to the present invention taken along line 3—3 of FIG. 2.

It can be appreciated by reference to FIG. 1 that the efficiency of operation of the engine is, in part, dependent upon the efficiency with which kinetic energy is imparted to the rotor stage 10. This is, in turn, dependent upon the prevention of leakage of operating fluid between the airfoil 20 and encircling shroud 30. In addition to reducing engine efficiency, such leakage also results in undesirable heating in the area of the blade-shroud interface. The present invention deals particularly with these problems. Thus, the present invention pertains to the tip cap portion 38 of blade 10. Referring to FIGS. 2 and 3, the invention will now be described.

As stated, blade 10 is formed in an airfoil shape and includes side walls 22 and 24. The blade also incorporates an internal cavity 40 into which cooling air is directed as discussed hereinafter. The radial extremities of side walls 22 and 24 are designated 42 and 44, respectively. In the area of these extremities, the blade is open-ended absent the tip cap. This open end area is designated generally 46. In order to provide a seal for the blade interior and its cavity 40, the present invention provides a tip cap designated generally 50. The tip cap serves to partially isolate the blade interior from its environment for the purpose of closing the cavity 40.

The tip cap, as illustrated in FIGS. 2 and 3, comprises generally an axially and circumferentially extending closure plate 52, an upstanding radially extending rib 54, a pair of radially extending flanges 56 and 58, respectively, disposed at the lateral edges of the closure plate, and a cooling air hole 60 straddling the rib 54 and disposed near the leading edge portion of a tip cap. The tip cap cooperation with the blade is as follows. The closure plate 50 is disposed within the open end 46 of blade 10 in a recessed fasion so that the closure plate, the radial extremities 42 and 44 of side walls 22 and 24, respectively, and the encircling shroud 30 combine to form a tip space 62. The tip cap is held in position by cooperation between flanges 56 and 58 and side walls 22 and 24, respectively. In addition, the side walls include shoulders 64 and 66 against which the closure plate and flanges are brought in abutting engagement. Hence, the tip cap is retained positively in position.

In addition, the cooling of the tip space region has been found to be a function of the ratio between tip space height h in FIG. 3 and exposed width w. The greater this ratio, the less likelihood of the heated operating fluid being permitted to circulate against the tip cap and the greater the likelihood of effective cooling being provided by the cooling air exhausted into the tip space.

The upstanding rib 54 extends from the leading edge to the trailing edge of the tip cap along the contour of the airfoil and is disposed approximately equidistant from the side walls 22 and 24 of the airfoil. The rib projects into the tip space 62 and subdivides it, thereby increasing the height to width ratio of the tip space. The rib 54 straddles the cooling air aperture 60 and extends into proximity and cooperation with shroud 30. As a result, the tip space 62 is effectively divided into independent halves each having a high h/w ratio and each isolated from the other by the rib 54.

According to a major objective of the present invention, the radial extremities 42 and 44 of the side walls 22 and 24 extend into proximity with shroud 30, and combine with the rib 54 to form a labyrinth seal with the shroud 30. Due to the airfoil configuration of the side walls, and the disposition of the blade within a moving fluid, high pressure and low pressure sides of the blade are formed at side walls 24 and 22, respectively. The labyrinth seal thus formed serves to substantially prevent leakage of the moving fluid past the blade tip cap and thus enhances the efficiency of the engine.

As discussed hereinabove, it is not possible with present technology to achieve a perfect seal between the rotating rotor blade 10 and the static encircling shroud 30. In addition, the fluid passing through the flow path 37 is at extremely high temperatures. Hence, as a portion of this fluid, however small, migrates into the tip cap region, the tip cap becomes heated and means must be provided for cooling in this area. To this end, a portion of the air utilized to cool the general blade structure is diverted to the tip space. Cooling air resides within cavity 40 within the partially hollow blade 10 and is permitted to escape therefrom and into the tip space by means of aperture 60. This aperture is designed to meter the flow of cooling air into the tip space for the purpose of maintaining engine efficiency against the deleterious flow of excessive cooling air therefrom. Hence, that portion of the cooling air released to the tip space by the exhaust aperture must be put to effective utilization to maintain the tip cap at a moderate temperature.

In order to enhance the effective utilization of the cooling air within the tip space, the present invention provides means for directing the cooling air from the aperture 60 near the leading edge of the tip cap downstream therefrom and toward the trailing edge of the tip cap. This means for directing comprises the upstanding rib 54 in the present embodiment and also operates to reduce the portion of cooling air which is permitted to escape from the tip space into the moving fluid within the flow path 37. As a result, the rib directs this cooling air along the contour of the tip space and into contact with a greater proportion of the tip cap for the cooling thereof than is the case with prior art tip cooling devices.

As a result of all of these facets, the present invention provides substantial improvement to a variety of problems encountered with respect to prior art rotor blade tip cap sealing and cooling designs. The present invention permits the blade 10 to rotate in proximity with shroud 30 and maintain an effective labyrinth seal against the leakage of operating fluid past the tip of the blade. In addition, the present invention enables the tip region to be cooled effectively by the means of advantageously low quantities of cooling air. The structure by which this is accomplished has been illustrated in one embodiment. It is apparent that those skilled in the art may and will modify the structure of this embodiment substantially without departing from the scope of the present invention. For example, the single rib 54 of the present tip cap may be replaced by multiple ribs which further subdivide the tip space and provide sealing interfaces with the shroud 30. In addition, various advantages of the present invention can be utilized without the necessity of extending the rib 54 into proximity with the shroud. These and other such modifications of the present embodiment fall within the spirit of the present invention.

What is claimed as new and sought to be secured by Letters Patent of the United States is:

1. In a partially hollow turbomachinery blade having an upstream end, a downstream end and spaced radially extending sidewalls defining a partially open radially outward end, the blade used in cooperation with a circumscribing shroud disposed near the radial extremities of said sidewalls, a tip cap for cooperating with the open blade end, the tip cap comprising:
   a generally axially extending closure plate for providing a partial seal between the blade interior and the blade environment, the closure plate recessed from the radial extremities of said sidewalls and defining therewith and with the shroud a tip space; and
   a rib extending radially outwardly from the closure plate and generally axially from the upstream to the downstream end of said blade for partially dividing the tip space.

2. The tip cap of claim 1 wherein said rib extends into proximity with said shroud.

3. The tip cap of claim 1 wherein said rib is disposed approximately equidistant from said sidewalls.

4. The tip cap of claim 1 wherein said sidewalls combine to form an airfoil.

5. The tip cap of claim 2 wherein said rib combines with said sidewalls to form a labyrinth seal with said shroud.

6. The tip cap of claim 5 wherein said sidewalls combine to form an airfoil, the blade is disposed within a moving fluid such that high pressure and low pressure sides of the blade are formed, and the labyrinth seal serves to substantially prevent leakage of the moving fluid past the blade tip cap.

7. The tip cap of claim 1 wherein said blade further comprises an internal cavity for cooling air, and the tip cap further includes an exhaust aperture for releasing a portion of said cooling air to said tip space for cooling said tip cap.

8. The tip cap of claim 7 further comprising upstream and downstream ends and wherein said exhaust aperture is disposed proximate one of said ends and said tip cap includes means for directing said cooling air toward the other of said ends within the tip space.

9. The tip cap of claim 8 wherein said means for directing includes said rib.

10. The tip cap of claim 1 further comprising a flange extending generally radially from said closure plate for cooperating with one of said sidewalls in a retaining relationship.

11. The tip cap of claim 1 wherein said one of said sidewalls includes a shoulder, and said flange engages said shoulder.

12. A turbomachinery rotor blade for use in cooperation with a circumscribing shroud in a moving fluid, the blade comprising:
   upstream and downstream ends;
   an internal cavity for cooling air;
   a pair of spaced radially extending sidewalls;
   an open end between the radial extremities of said sidewalls;
   a tip cap disposed within said open end, the tip cap including a generally axially extending closure plate for providing a partial seal between the blade interior and the blade environment, the closure plate recessed from the radial extremities of said sidewalls and defining therewith and with the shroud a tip space;
   a rib extending radially outwardly from the closure plate and generally axially from the upstream to the downstream end of said blade for partially dividing the tip space; and
   exhaust apertures for releasing a portion of said cooling air to said tip space for cooling said tip cap.

* * * * *